United States Patent
Choi et al.

(10) Patent No.: US 11,751,145 B2
(45) Date of Patent: Sep. 5, 2023

(54) METHOD AND APPARATUS FOR CONTROLLING POWER OF IAB NODE IN WIRELESS COMMUNICATION SYSTEM

(71) Applicant: Samsung Electronics Co., Ltd., Suwon-si (KR)

(72) Inventors: Seunghoon Choi, Suwon-si (KR); Hyunseok Ryu, Suwon-si (KR); Youngbum Kim, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/450,397

(22) Filed: Oct. 8, 2021

(65) Prior Publication Data
US 2022/0116887 A1    Apr. 14, 2022

(30) Foreign Application Priority Data
Oct. 8, 2020   (KR) .................. 10-2020-0130324

(51) Int. Cl.
*H04W 52/30*    (2009.01)
*H04W 84/04*    (2009.01)

(52) U.S. Cl.
CPC .......... *H04W 52/30* (2013.01); *H04W 84/047* (2013.01)

(58) Field of Classification Search
CPC .......... H04W 52/00–60; H04W 52/30; H04W 84/047
See application file for complete search history.

(56) References Cited

U.S. PATENT DOCUMENTS

| | | | |
|---|---|---|---|
| 7,151,795 B1* | 12/2006 | Goldburg | H04W 52/34 455/67.11 |
| 2017/0338853 A1* | 11/2017 | He | H04B 1/525 |
| 2018/0098291 A1* | 4/2018 | Fodor | H04W 52/346 |
| 2018/0359069 A1* | 12/2018 | Nam | H04B 17/345 |
| 2019/0132807 A1 | 5/2019 | Abedini et al. | |
| 2019/0335446 A1* | 10/2019 | Guha | H04W 72/21 |
| 2019/0349764 A1* | 11/2019 | Suh | H04L 63/0892 |

(Continued)

FOREIGN PATENT DOCUMENTS

| | | |
|---|---|---|
| EP | 3720200 A1 | 10/2020 |
| WO | 2020060232 A1 | 3/2020 |

OTHER PUBLICATIONS

International Search Report and Written Opinion of the International Searching Authority in connection with International Application No. PCT/KR2021/013881 dated Jan. 7, 2022, 7 pages.

(Continued)

*Primary Examiner* — Raymond S Dean

(57) ABSTRACT

The disclosure relates to a communication technique for convergence between an IoT technology and a 5G communication system for supporting a higher data transmission rate beyond a 4G system, and a system thereof. The disclosure may be applied to intelligence services (e.g., smart homes, smart buildings, smart cities, smart cars or connected cars, healthcare, digital education, retail businesses, security and safety related services, etc.) according to a 5G communication system and an IoT related technology. In addition, the disclosure provides a method and an apparatus for controlling power of an IAB node in a wireless communication system.

13 Claims, 11 Drawing Sheets

(56) References Cited

U.S. PATENT DOCUMENTS

2021/0144719 A1    5/2021  Choi et al.
2021/0410176 A1*  12/2021  Luo ..................... H04W 88/14

OTHER PUBLICATIONS

Huawei et al., "Enhancements for simultaneous operation of MT and DU" 3GPP TSG RAN WG1, Meeting #102-e, R1-2005261, E-meeting, Aug. 17-28, 2020, 11 pages.
Lenovo et al., "Enhancements for simultaneous operation in IAB systems" 3GPP TSG RAN WG1, Meeting #102-e, R1-2005928, e-Meeting, Aug. 17-28, 2020, 4 pages.

* cited by examiner

METHOD AND APPARATUS FOR CONTROLLING POWER OF IAB NODE IN WIRELESS COMMUNICATION SYSTEM

CROSS-REFERENCE TO RELATED APPLICATION

This application is based on and claims priority under 35 U.S.C. § 119 to Korean Patent Application No. 10-2020-0130324, filed on Oct. 8, 2020, in the Korean Intellectual Property Office, the disclosure of which is herein incorporated by reference in its entirety.

BACKGROUND

1. Field

The disclosure relates to a method and an apparatus for controlling power of an integrated access and backhaul (IAB) node in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

As coverage is limited due to attenuation of a propagation path in a super-high frequency band (a band of 6 GHz or greater or an mmWave band) which can be used in the 5G system, research into an integrated access and backhaul (IAB) technology of transmitting or receiving backhaul data to or from a base station and finally transmitting or receiving access data to or from a terminal through multiple relays, by using a broadband radio frequency resource, has been conducted.

The above information is presented as background information only to assist with an understanding of the disclosure. No determination has been made, and no assertion is made, as to whether any of the above might be applicable as prior art with regard to the disclosure.

SUMMARY

In the 5G system, coverage may be limited due to attenuation of a propagation path while a base station transmits or receives data to or from a terminal in a band of 6 GHz or greater, specifically, in an mmWave band. Problems caused by the limitation of coverage may be resolved by closely arranging multiple relays on a propagation path between the base station and the terminal, but there may be a serious cost problem for installing an optical cable for backhaul connection between the relays.

Accordingly, instead of installing the optical cable between the relays, broadband radio frequency resources available in mmWave may be used to transmit or receive backhaul data between the relays, whereby the cost problem of installing the optical cable can be solved and the mmWave band can be more efficiently used. A technology of transmitting or receiving backhaul data to or from a base station by using mmWave and finally transmitting or receiving access data to or from a terminal through multiple relays is referred to as integrated access and backhaul (IAB), and a relay node for transmitting or receiving data to or from the base station via wireless backhaul is referred to as an IAB node. When the IAB node transmits or receives the backhaul data, data needs to be received from the base station and access data needs to be transmitted to the terminal by using the same frequency band, and due to characteristics of the IAB node of receiving the access data from the terminal and transmitting the backhaul data to the base station, the IAB node has unidirectional transmission/reception characteristics at an instant.

Accordingly, as a method for reducing transmission/reception delay caused by the unidirectional transmission/reception characteristics of the IAB node, frequency domain multiplexing (FDM) or spatial domain multiplexing (SDM) may be performed on backhaul data (downlink data received by the IAB node from a parent IAB node and uplink data received by the IAB node from a child IAB node) and access data (uplink data received by the IAB node from the terminal) from the terminal when the IAB node receives data. In this case, when the IAB node receives the data by including only one radio frequency (RF), access data reception is difficult when adaptive gain control (AGC) or analog-to-digital converter (ADC) is performed due to a power difference between backhaul reception and the access reception. Accordingly, an embodiment of the disclosure provides a power control scheme required when receiving backhaul downlink data.

In addition, when the IAB node transmits the data, FDM/SDM may be performed on backhaul data (uplink data from the IAB node to the parent IAB node and downlink data from the IAB node to the child IAB node) and access data (downlink data from the IAB node to the terminal) to the terminal. Here, when the IAB node transmits the data by including only one RF, power of the IAB node may be limited, and in this case, operations of the IAB node need to be defined. Accordingly, an embodiment of the disclosure provides an operation of an IAB node during the transmission power limitation above.

In addition, when the IAB node has bidirectional transmission and reception characteristics and transmits or receives data, FDM/SDM may be simultaneously performed on signals (downlink data/control signal from a DU of a parent IAB node to an MT of the IAB node and uplink data/control signal from the MT of the IAB node to the DU of the parent IAB node) of a parent backhaul link and a signal (uplink data/control signal from an MT of a child IAB node to a DU of the IAB node and downlink data/control signal from the DU of the IAB node to the MT of the child IAB node) of a child backhaul link or a signal (uplink data/control signal from the terminal to the IAB node and downlink signal from the IAB node to the terminal) of an access link with the terminal. In this case, when the MT and the DU of the IAB node simultaneously perform transmission and reception, a method for controlling power by the IAB node is required to reduce an effect of an interference signal to a reception signal. Accordingly, an embodiment of the disclosure provides a method and an apparatus for controlling power of an IAB node to reduce self-interference when IAB performs bidirectional transmission and reception as described above.

An embodiment of the disclosure provides a scheme of controlling power required to receive backhaul downlink data. In addition, an embodiment of the disclosure provides an operation of an IAB node when transmission power is limited. In addition, an embodiment of the disclosure provides a power control operation of an IAB node for reduction of self-interference when an IAB node performs bidirectional transmission and reception.

In accordance with an aspect of the disclosure, a method for an integrated access and backhaul (IAB) node in a communication system is provided. The method comprises identifying whether a transmission and a reception are performed simultaneously; identifying a maximum power associated with a simultaneous transmission and reception of the IAB node, in case that the transmission and the reception are performed simultaneously; determining a power for the transmission based on the maximum power; and transmitting a signal based on the determined power for the transmission.

In accordance with another aspect of the disclosure, an integrated access and backhaul (IAB) node in a communication system is provided. The IAB node comprises a transceiver; and a controller configured to: identify whether a transmission and a reception are performed simultaneously; identify a maximum power associated with a simultaneous transmission and reception of the IAB node, in case that the transmission and the reception are performed simultaneously; determine a power for the transmission based on the maximum power; and transmit a signal based on the determined power for the transmission.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
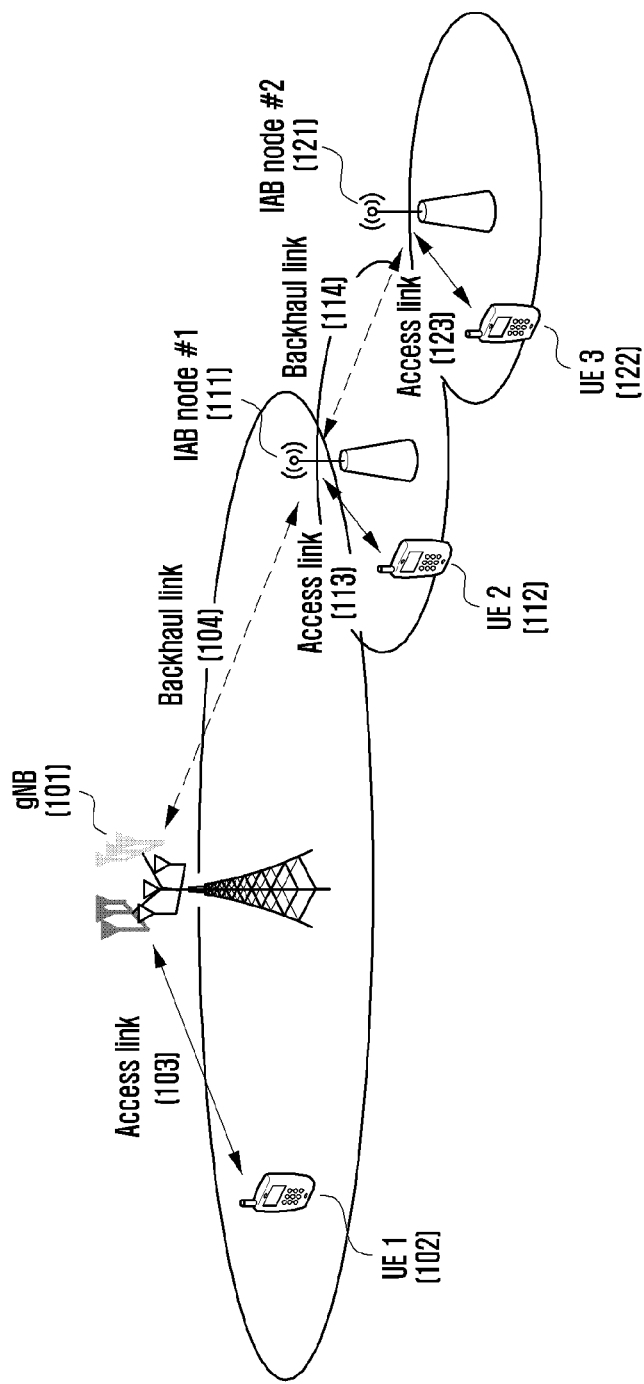
FIG. 1 illustrates a communication system in which IAB is managed according to an embodiment of the disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Wireless communication systems have expanded beyond the original role of providing a voice-oriented service and have evolved into wideband wireless communication systems that provide a high-speed and high-quality packet data service according to, for example, communication standards such as high-speed packet access (HSPA), long-term evolution (LTE or evolved universal terrestrial radio access (E-UTRA)), LTE-Advanced (LTE-A), and LTE-Pro of 3GPP, high-rate packet data (HRPD) and a ultra-mobile broadband (UMB) of 3GPP2, and 802.16e of IEEE.

As a representative example of the broadband wireless communication systems, in the LTE system, an orthogonal frequency-division multiplexing (OFDM) scheme has been adopted for a downlink (DL), and a single carrier frequency division multiple access (SC-FDMA) scheme have been adopted for an uplink (UL). The uplink indicates a radio link through which data or a control signal is transmitted from a terminal (a user equipment (UE) or a mobile station (MS)) to a base station (an eNode B, or a base station (BS)), and the downlink indicates a radio link through which data or a control signal is transmitted from a base station to a terminal. In the above-mentioned multiple-access scheme, normally, data or control information is distinguished according to a user by assigning or managing time-frequency resources for carrying data or control information of each user, wherein the time-frequency resources do not overlap, that is, orthogonality is established.

A future communication system subsequent to the LTE, that is, a 5G (or NR) communication system, has to be able to freely reflect various requirements from a user, a service provider, and the like, and thus service satisfying all of the various requirements needs to be supported. The services considered for the 5G communication system include enhanced mobile broadband (eMBB), massive machine-type communication (mMTC), ultra-reliable low-latency communication (URLLC), etc.

eMBB aims to provide a data rate superior to the data rate supported by the existing LTE, LTE-A, or LTE-Pro. For example, in the 5G communication system, eMBB may be able to provide a peak data rate of 20 Gbps in the downlink and a peak data rate of 10 Gbps in the uplink from the viewpoint of one base station. In addition, the 5G communication system may be able to provide not only the peak data rate but also an increased user-perceived terminal data rate. In order to satisfy such requirements, improvement of various transmitting and receiving technologies including a further improved multi-input multi-output (MIMO) transmission technology may be required. In addition, a signal is transmitted using a transmission bandwidth of up to 20 MHz in the 2 GHz band used by the current LTE, but the 5G communication system uses a bandwidth wider than 20 MHz in the frequency band of 3 to 6 GHz or 6 GHz or higher, thereby satisfying the data rate required in the 5G communication system.

In addition, mMTC is being considered to support application services such as the Internet of Things (IoT) in the 5G communication system. mMTC may be required to support access by a large number of terminals in a cell, coverage enhancement of a terminal, improved battery time, and cost reduction of a terminal in order to efficiently provide the IoT. The IoT needs to be able to support a large number of terminals (for example, 1,000,000 terminals/km2) in a cell because it is attached to various sensors and devices to provide communication functions. Furthermore, a terminal supporting mMTC is more likely to be located in a shaded area that is not covered by a cell due to the nature of services, such as a basement of a building, and thus the terminal requires wider coverage than other services provided in the 5G communication system. The terminal supporting mMTC needs to be configured as an inexpensive terminal and may require a very long battery lifetime, such as 10 to 15 years, because it is difficult to frequently replace the battery of the terminal.

Finally, URLLC is a cellular-based wireless communication service used for mission-critical purposes. For example, services used for remote control for a robot or machinery, industrial automation, an unmanned aerial vehicle, remote health care, an emergency alert, or the like may be considered. Accordingly, the communication provided by URLLC may provide very low latency and very high reliability. For example, a service that supports URLLC needs to satisfy air interface latency of less than 0.5 milliseconds, and may also have requirements of a packet error rate of 10-5% or lower. Therefore, for the service that supports URLLC, the 5G system needs to provide a transmission time interval (TTI) smaller than those of other services, and design matters for allocating wide resources in the frequency band in order to secure reliability of the communication link may also arise.

The above-described three services considered in the 5G communication system, that is, eMBB, URLLC, and mMTC, may be multiplexed and transmitted in a single system. Here, in order to satisfy the different requirements of each of the services, different transmission or reception techniques and different transmission and reception parameters may be used for the services.

In the 5G system, coverage may be limited due to attenuation of a propagation path while a base station transmits or receives data to or from a terminal in a band of 6 GHz or greater, specifically, in an mmWave band. Problems caused by the limitation of coverage may be resolved by closely arranging multiple relays on a propagation path between the base station and the terminal, but there may be a serious cost problem for installing an optical cable for backhaul connection between the relays.

Accordingly, instead of installing the optical cable between the relays, broadband radio frequency resources available in mmWave may be used to transmit or receive backhaul data between the relays, whereby the cost problem of installing the optical cable can be solved and the mmWave band can be more efficiently used. A technology of transmitting or receiving backhaul data to or from a base station by using mmWave and finally transmitting or receiving access data to or from a terminal through multiple relays is referred to as integrated access and backhaul (IAB), and a relay node for transmitting or receiving data to or from the base station via wireless backhaul is referred to as an IAB node. When the IAB node transmits or receives the backhaul data, data needs to be received from the base station and access data needs to be transmitted to the terminal by using the same frequency band, and due to characteristics of the IAB node of receiving the access data from the terminal and transmitting the backhaul data to the base station, the IAB node has unidirectional transmission/reception characteristics at an instant.

Accordingly, as a method for reducing transmission/reception delay caused by the unidirectional transmission/reception characteristics of the IAB node, frequency domain multiplexing (FDM) or spatial domain multiplexing (SDM) may be performed on backhaul data (downlink data received by the IAB node from a parent IAB node and uplink data received by the IAB node from a child IAB node) and access data (uplink data received by the IAB node from the terminal) from the terminal when the IAB node receives data. In this case, when the IAB node receives the data by including only one radio frequency (RF), access data reception is difficult when adaptive gain control (AGC) or analog-to-digital converter (ADC) is performed due to a power difference between backhaul reception and the access reception. Accordingly, an embodiment of the disclosure provides a power control scheme required when receiving backhaul downlink data.

In addition, when the IAB node transmits the data, FDM/SDM may be performed on backhaul data (uplink data from the IAB node to the parent IAB node and downlink data from the IAB node to the child IAB node) and access data (downlink data from the IAB node to the terminal) to the terminal. Here, when the IAB node transmits the data by including only one RF, power of the IAB node may be limited, and in this case, operations of the IAB node needs to be defined. Accordingly, an embodiment of the disclosure provides an operation of an IAB node during the transmission power limitation above.

In addition, when the IAB node has bidirectional transmission and reception characteristics and transmits or receives data, FDM/SDM may be simultaneously performed on signals (downlink data/control signal from a DU of a parent IAB node to an MT of the IAB node and uplink data/control signal from the MT of the IAB node to the DU of the parent IAB node) of a parent backhaul link and a signal (uplink data/control signal from an MT of a child IAB node to a DU of the IAB node and downlink data/control signal from the DU of the IAB node to the MT of the child IAB node) of a child backhaul link or a signal (uplink data/control signal from the terminal to the IAB node and downlink signal from the IAB node to the terminal) of an access link with the terminal. In this case, when the MT and the DU of the IAB node simultaneously perform transmission and reception, a method for controlling power by the IAB node is required to reduce an effect of an interference signal to a reception signal. Accordingly, an embodiment of the disclosure provides a method and an apparatus for controlling power of an IAB node to reduce self-interference when IAB performs bidirectional transmission and reception as described above.

First, a communication system in which IAB is managed is described with reference to FIG. 1.

FIG. 1 illustrates a communication system in which IAB is managed according to an embodiment of the disclosure.

In FIG. 1, a gNB 101 is a general base station, and is called a base station or a donor base station in the disclosure. An IAB node 1 111 and an IAB node 2 121 are IAB nodes transmitting or receiving a backhaul link in an mmWave band. A terminal 1 102 transmits or receive access data to or from the gNB 101 through an access link 103. The IAB node 1 111 transmits or receive backhaul data to or from the gNB 101 through a backhaul link 104. A terminal 2 112 transmits or receives access data to or from the IAB node 1 111 through an access link 113. The IAB node 2 121 transmits or receives backhaul data to or from the IAB node 1 111 through a backhaul link 114. Accordingly, the IAB node 1 111 is an upper IAB node of IAB node 2 121 and is called a parent IAB node, and the IAB node 2 121 is a lower IAB node of IAB node 1 111 and is called a child IAB node. A terminal 3 122 transmits or receives access data to or from the IAB node 2 121 through an access link 123.

Next, multiplexing of a backhaul link between the base station and the IAB node or between the IAB node and the IAB node and an access link between the base station and the terminal or between the IAB node and the terminal in an IAB technology provided in the disclosure is described in detail with reference to FIGS. 2, 3, and 4.

Figure 2:
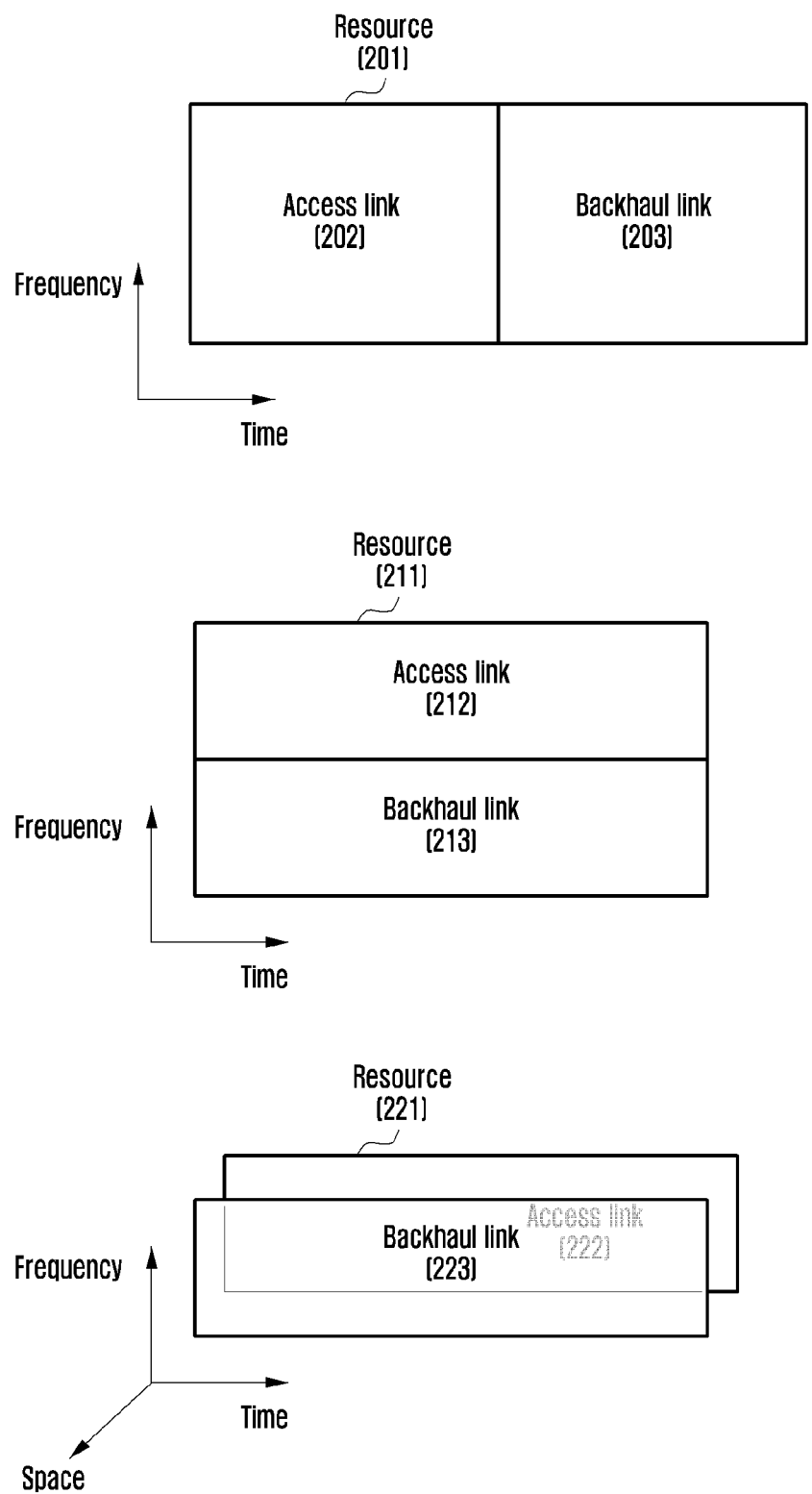
FIG. 2 illustrates time-division, frequency-division, and spatial-division multiplexing of an access link and a backhaul link in IAB according to an embodiment of the disclosure.

FIG. 2 illustrates time-division, frequency-division, and spatial-division multiplexing of an access link and a backhaul link in IAB according to an embodiment of the disclosure.

The top of FIG. 2 illustrates time-division multiplexing of an access link and a backhaul link in the IAB. The middle of FIG. 2 illustrates frequency-division multiplexing of an access link and a backhaul link in IAB. The bottom of FIG. 2 illustrates spatial-division multiplexing of an access link and a backhaul link in IAB.

The top of FIG. 2 illustrates time-division multiplexing (TDM) of a backhaul link 203 between the base station and the IAB node or between the IAB node and the IAB node and an access link 202 between the base station and the terminal or between the IAB node and the terminal in a wireless resource 201. Accordingly, no data is transmitted or received between the base station and the IABs in the time division in which the base station or the IAB node transmits or receives data to or from the terminal, and the base station or the IAB node transmits or receives no data to the terminal in the time division in which data transmission or reception is performed between the base station and the IAB nodes.

The middle of FIG. 2 illustrates frequency-division multiplexing (FDM) of a backhaul link 213 between the base station and the IAB node or between the IAB node and the IAB node and an access link 212 between the base station and the terminal or between the IAB node and the terminal in a wireless resource 211. Accordingly, it is possible to perform data transmission or reception between the base station and the IAB nodes in the time division in which the base station or the IAB node transmits or receives data to the terminal. If an IAB node has unidirectional transmission or reception capability (for example, when information relating to capability indicating that a DU and an MT within an IAB node cannot simultaneously perform transmission and reception is indicated to a parent IAB node or a donor base station by the IAB node), only data transmission in the same direction is allowed. That is, in the time division in which one IAB node receives data from the terminal, the IAB node can only receive backhaul data from another IAB node or the base station.

In addition, in the time division in which one IAB node transmits data to the terminal, the IAB node can only transmit backhaul data to another IAB node or the base station. If the IAB node has bidirectional transmission or reception capability (for example, information relating to capability indicating that a DU and an MT within an IAB node can simultaneously perform transmission and reception is indicated to a parent IAB node or a donor base station by the IAB node), bidirectional data transmission or reception is possible. That is, in the time division in which one IAB node receives data from the terminal, the IAB node can transmit backhaul data to another IAB node or the base station. In addition, in the time vision in which one IAB node transmits data to the terminal, the IAB node can receive backhaul data from another IAB node or the base station.

The bottom of FIG. 2 illustrates spatial-division multiplexing (SDM) of a backhaul link 223 between the base station and the IAB node or between the IAB node and the IAB node and an access link 222 between the base station and the terminal or between the IAB node and the terminal in a wireless resource 221. Accordingly, it is possible to perform data transmission or reception between the base station and the IAB nodes in the time division in which the base station or the IAB node transmits or receives data to the terminal. However, if an IAB node has unidirectional transmission or reception capability (for example, when information relating to capability indicating that a DU and an MT within an IAB node cannot simultaneously perform transmission and reception is indicated to a parent IAB node or a donor base station by the IAB node), only data transmission in the same direction is allowed. That is, in the time division in which one IAB node receives data from the terminal, the IAB node can only receive backhaul data from another IAB node or the base station.

In addition, in the time division in which one IAB node transmits data to the terminal, the IAB node can only transmit backhaul data to another IAB node or the base station. If the IAB node has bidirectional transmission or reception capability (for example, information relating to capability indicating that a DU and an MT within an IAB node can simultaneously perform transmission and reception is indicated to a parent IAB node or a donor base station by the IAB node), bidirectional data transmission or reception is possible. That is, in the time division in which one IAB node receives data from the terminal, the IAB node can transmit backhaul data to another IAB node or the base station. In addition, in the time vision in which one IAB node transmits data to the terminal, the IAB node can receive backhaul data from another IAB node or the base station.

When the IAB node performs initial access, a multiplexing technique to be used among the TDM, FDM, and SDM, whether unidirectional transmission or reception is possible, or whether simultaneous bi-direction transmission and reception is possible may be received through an RRC signal or system information from an accessing base station or upper IAB nodes. Alternatively, when the IAB node transmits information on the capability to the upper IAB node or the base station through the RRC signal, the IAB node may add the multiplexing technique or capability information on unidirectional/bidirectional transmission or reception, and may also receive related configuration information from the accessing base station or upper IAB nodes through the system information or the RRC signal, or may also receive related configuration information from the base station or upper IAB nodes through a backhaul link.

Figure 3:
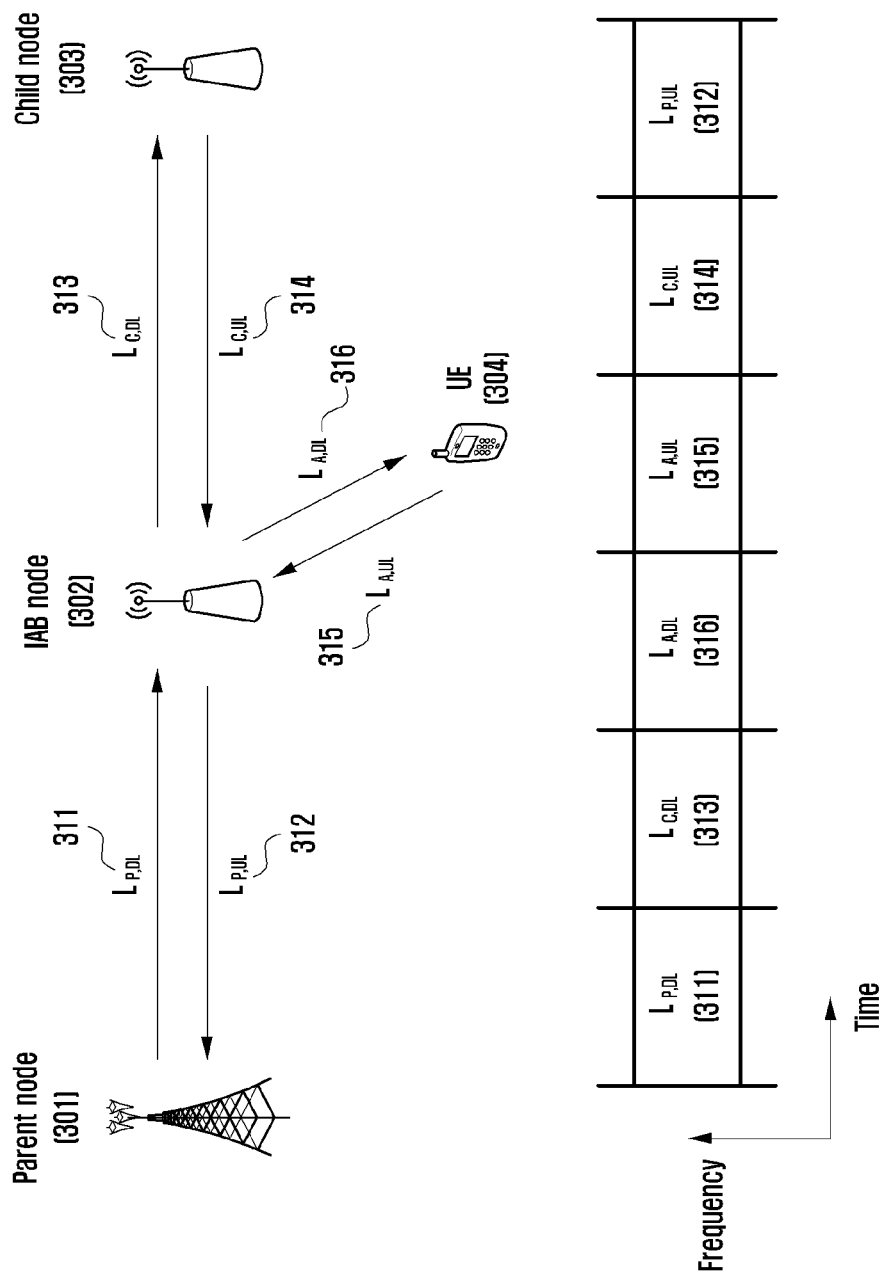
FIG. 3 illustrates time-division multiplexing of an access link and a backhaul link in IAB according to an embodiment of the disclosure.

FIG. 3 illustrates time-division multiplexing of an access link and a backhaul link in IAB according to an embodiment of the disclosure.

The top of FIG. 3 illustrates that an IAB node 302 communicates with a parent node 301, a child IAB node 303, a terminal 304. Each link between nodes is described in more detail below. The parent node 301 transmits a backhaul downlink signal to the IAB node 302 through a backhaul downlink (LP,DL), and the IAB node 302 transmits a backhaul uplink signal to the parent node 301 through a backhaul uplink (LP,UL). The IAB node 302 transmits an access downlink signal to the terminal 304 through an access downlink (LA,DL), and the terminal 304 transmits an access uplink signal to the IAB node 302 through an access uplink (LA,UL). The IAB node 302 transmits a backhaul downlink signal to the child node 303 through a backhaul downlink (LC,DL), and the child IAB node 303 transmits a backhaul uplink signal to the IAB node 302 through a backhaul uplink (LC,UL). In the above notation, P indicates, as a backhaul link with a parent node, a parent link in the perspective of one IAB node 302. A indicates an access link with a terminal, and C indicates a backhaul link with a child node. Links of A and C may be included in a child link in the perspective of one IAB node 302.

These link relationships are described with reference to the IAB node 302, and in the perspective of the child IAB node 303, the IAB node 302 corresponds to a parent node, and there may be another child IAB node as a lower node of the child IAB node 303. In addition, in the perspective of the parent node 301, the IAB node 302 corresponds to a child node, and there may be another IAB parent node as an upper node of the parent node 301.

The signal described above includes data and control information, a channel for transmitting data and control information, a reference signal required to decode data and control information, or reference signals for identifying channel information.

The bottom of FIG. 3 illustrates multiplexing of the links in all divisions. The bottom of FIG. 3 illustrates multiplexing of a backhaul downlink (LP,DL) 311, a backhaul downlink (LC,DL) 313, an access downlink (LA,DL) 316, an access uplink (LA,UL) 315, a backhaul uplink (LC,UL) 314, and a backhaul uplink (LP,UL) 312 in a time sequence. The temporal order between the links illustrated in FIG. 3 is just an example, and any other temporal order may be applied without problems.

In FIG. 3, the links are multiplexed in the time division according to a time sequence, and thus the multiplexing shown in FIG. 3 corresponds to a multiplexing scheme consuming the longest time to transmit a signal from the parent node 301 to the child IAB node 303 through the IAB node 302, and also transmit the signal to the terminal. Accordingly, in order to reduce latency when transmitting the signal from the parent node 301 to the final terminal, a method for multiplexing the backhaul link and the backhaul link or the backhaul link and the access links in the frequency division or the spatial division and transmitting the same at the same time may be considered.

Figure 4:
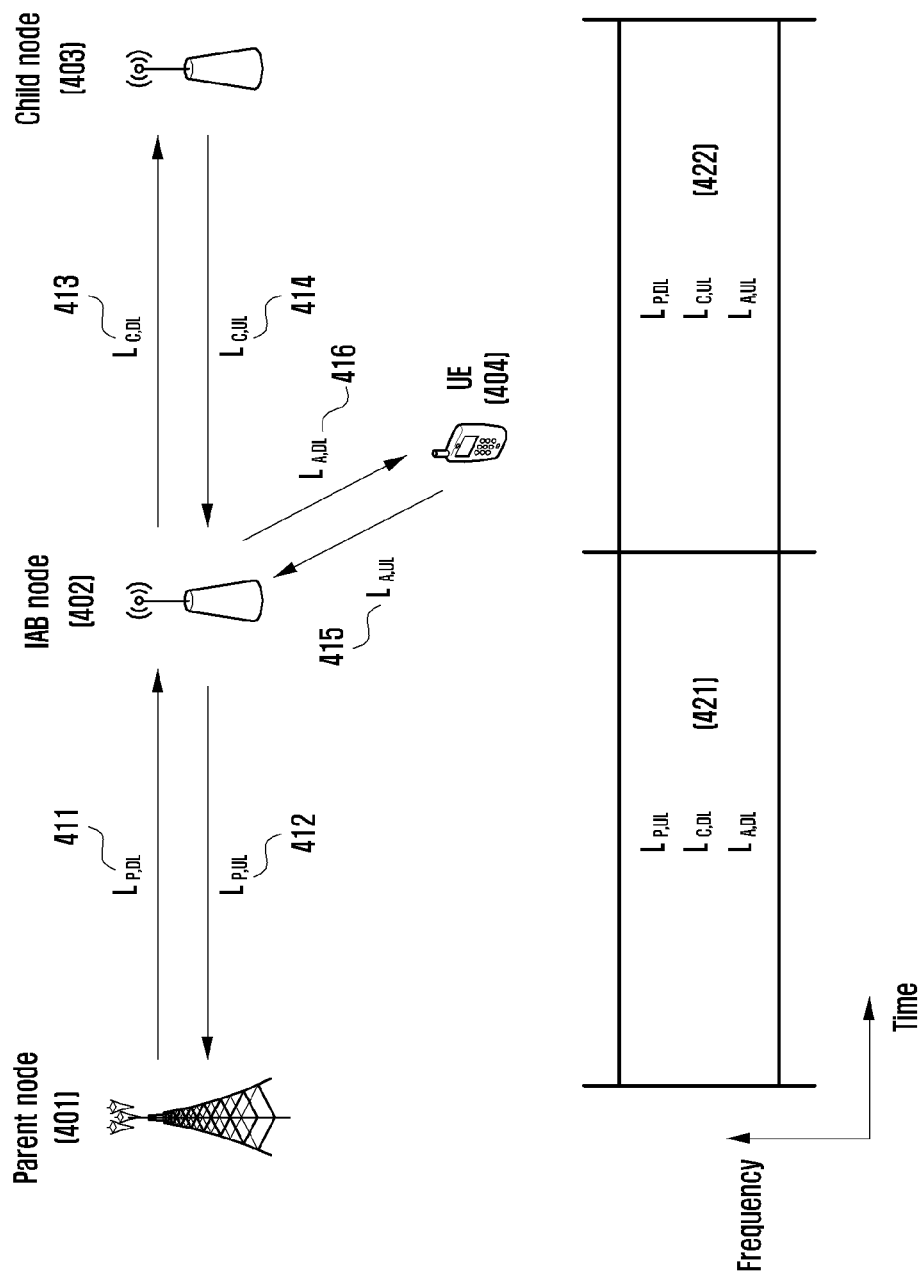
FIG. 4 illustrates the first example of frequency-division and spatial-division multiplexing of an access link and a backhaul link in IAB according to an embodiment of the disclosure.

FIG. 4 illustrates the first example of frequency-division and spatial-division multiplexing of an access link and a backhaul link in IAB according to an embodiment of the disclosure.

A method for reduction of latency by multiplexing the backhaul link and the backhaul link or the backhaul link and the access links in the frequency division or the spatial division is described with reference to FIG. 4.

The top of FIG. 4 illustrates that an IAB node 402 communicates with a parent node 401, a child IAB node 403, and a terminal 404. Each link between nodes is described in more detail below. The parent node 401 transmits a backhaul downlink signal to the IAB node 402 through a backhaul downlink (LP,DL), and the IAB node 402 transmits a backhaul uplink signal to the parent node 401 through a backhaul uplink (LP,UL). The IAB node 402 transmits an access downlink signal to the terminal 404 through an access downlink (LA,DL), and the terminal 404 transmits an access uplink signal to the IAB node 402 through an access uplink (LA,UL). The IAB node 402 transmits a backhaul downlink signal to the child IAB node 403 through a backhaul downlink (LC,DL), and the child IAB node 403 transmits a backhaul uplink signal to the IAB node 402 through a backhaul uplink (LC,UL). In the above notation, P indicates a backhaul link with a parent node, A indicates an access link with a terminal, and C indicates a backhaul link with a child node.

These link relationships are described with reference to the IAB node 402, and in the perspective of the child IAB node 403, the IAB node 402 corresponds to a parent node, and there may be another child IAB node as a lower node of the child IAB node 403. In addition, in the perspective of the parent node 401, the IAB node 402 corresponds to a child node, and there may be another IAB parent node as an upper node of the parent node 401.

The signal described above includes data and control information, a channel for transmitting data and control information, a reference signal required to decode data and control information, or reference signals for identifying channel information.

Next, a scheme of multiplexing the above-described links in the frequency division and the spatial division is described with reference to the bottom of FIG. 4.

When an IAB node has a unidirectional transmission or reception feature at a moment, signals allowing frequency-division multiplexing or spatial-division multiplexing are restricted. In a case of considering the unidirectional transmission or reception feature of the IAB node 402, a link which can be multiplexed in the time division in which the IAB node can perform transmission includes a backhaul uplink (LP,UL) 412, a backhaul downlink (LC,DL) 413, and an access downlink (LA,DL) 416. Accordingly, when the links are multiplexed in the frequency division or the spatial division, the IAB node 402 may transmit all the links in the same time division as shown in 421. In addition, a link which can be multiplexed in the time division in which the IAB node can perform reception includes a backhaul downlink (LP,DL) 411, a backhaul uplink (LC,UL) 414, and an access uplink (LA,UL) 415. Accordingly, when the links are multiplexed in the frequency division or the spatial division, the IAB node 402 may receive all the links in the same time division as shown in 422.

Multiplexing of the links provided in FIG. 4 is an example, and it is also possible to multiplex only two links among three links multiplexed in the frequency or spatial division.

Figure 5:
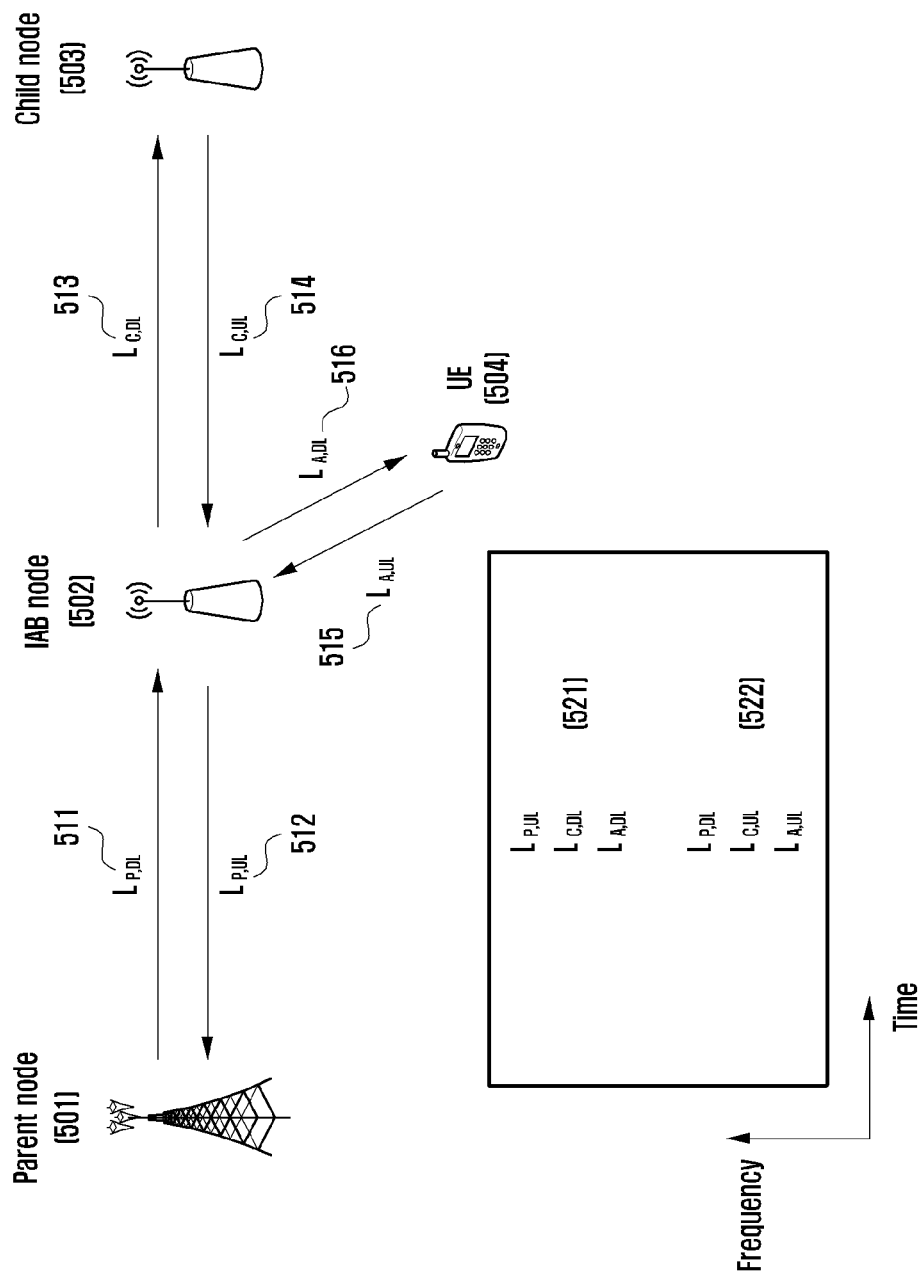
FIG. 5 illustrates the second example of frequency-division and spatial-division multiplexing of an access link and a backhaul link in IAB according to an embodiment of the disclosure.

FIG. 5 illustrates the second example of frequency-division and spatial-division multiplexing of an access link and a backhaul link in IAB according to an embodiment of the disclosure.

Specifically, a case in which an IAB node has bidirectional transmission or reception feature, unlike the case in FIG. 4, is described.

A method for reduction of latency by multiplexing the backhaul link and the backhaul link or the backhaul link and the access links in the frequency division or the spatial division is described with reference to FIG. 5.

The top of FIG. 5 illustrates that an IAB node 502 communicates with a parent node 501, a child IAB node 503, and a terminal 504. Each link between nodes is described in more detail below. The parent node 501 transmits a backhaul downlink signal to the IAB node 502 through a backhaul downlink (LP,DL), and the IAB node 502 transmits a backhaul uplink signal to the parent node 501 through a backhaul uplink (LP,UL). The IAB node 502 transmits an access downlink signal to the terminal 504 through an access downlink (LA,DL), and the terminal 504 transmits an access uplink signal to the IAB node 502 through an access uplink (LA,UL). The IAB node 502 transmits a backhaul downlink signal to the child IAB node 503 through a backhaul downlink (LC,DL), and the child IAB node 503 transmits a backhaul uplink signal to the IAB node 502 through a backhaul uplink (LC,UL). In the above notation, P indicates a backhaul link with a parent node, A indicates an access link with a terminal, and C indicates a backhaul link with a child node.

These link relationships are described with reference to the IAB node 502, and in the perspective of the child IAB node 503, the IAB node 502 corresponds to a parent node, and there may be another child IAB node as a lower node of the child IAB node 503. In addition, in the perspective of the parent node 501, the IAB node 502 corresponds to a child node, and there may be another IAB parent node as an upper node of the parent node 501.

The signal described above includes data and control information, a channel for transmitting data and control information, a reference signal required to decode data and control information, or reference signals for identifying channel information.

Next, a scheme of multiplexing the above-described links in the frequency division and the spatial division is described with reference to the bottom of FIG. 5.

As described above, in FIG. 5, unlike the case in FIG. 4, when an IAB node has a bidirectional transmission or reception feature at a moment, there may be no restrictions on signals allowing frequency-division multiplexing or spatial-division multiplexing. As a link which can be multiplexed by the IAB node in a specific time division, links such as a backhaul uplink (LP,UL) 512, a backhaul downlink (LC,DL) 513, an access downlink (LA,DL) 516, a backhaul downlink (LP,DL) 511, a backhaul uplink (LC,UL) 514, and an access uplink (LA,UL) 515 may be mixed. Accordingly, when the links are multiplexed in the frequency division or the spatial division, the IAB node 502 may multiplex and simultaneously transmit or receive the above six links or some of the links in the same time division as shown in 521 and 522.

In the perspective of one IAB node in FIG. 4, when links in the same direction in terms of transmission or reception are multiplexed in the frequency division or the spatial division, latency can be reduced when transmitting a signal from a parent node to a final terminal, compared to a case of multiplexing all links in the time division in FIG. 3. Alternatively, in the perspective of one IAB node in FIG. 5, when bidirectional links are multiplexed in the frequency division or the spatial division regardless of transmission or reception, latency can be more reduced when a signal is transmitted from a parent node to a final terminal, compared to the multiplexing method in FIG. 4.

Figure 6:
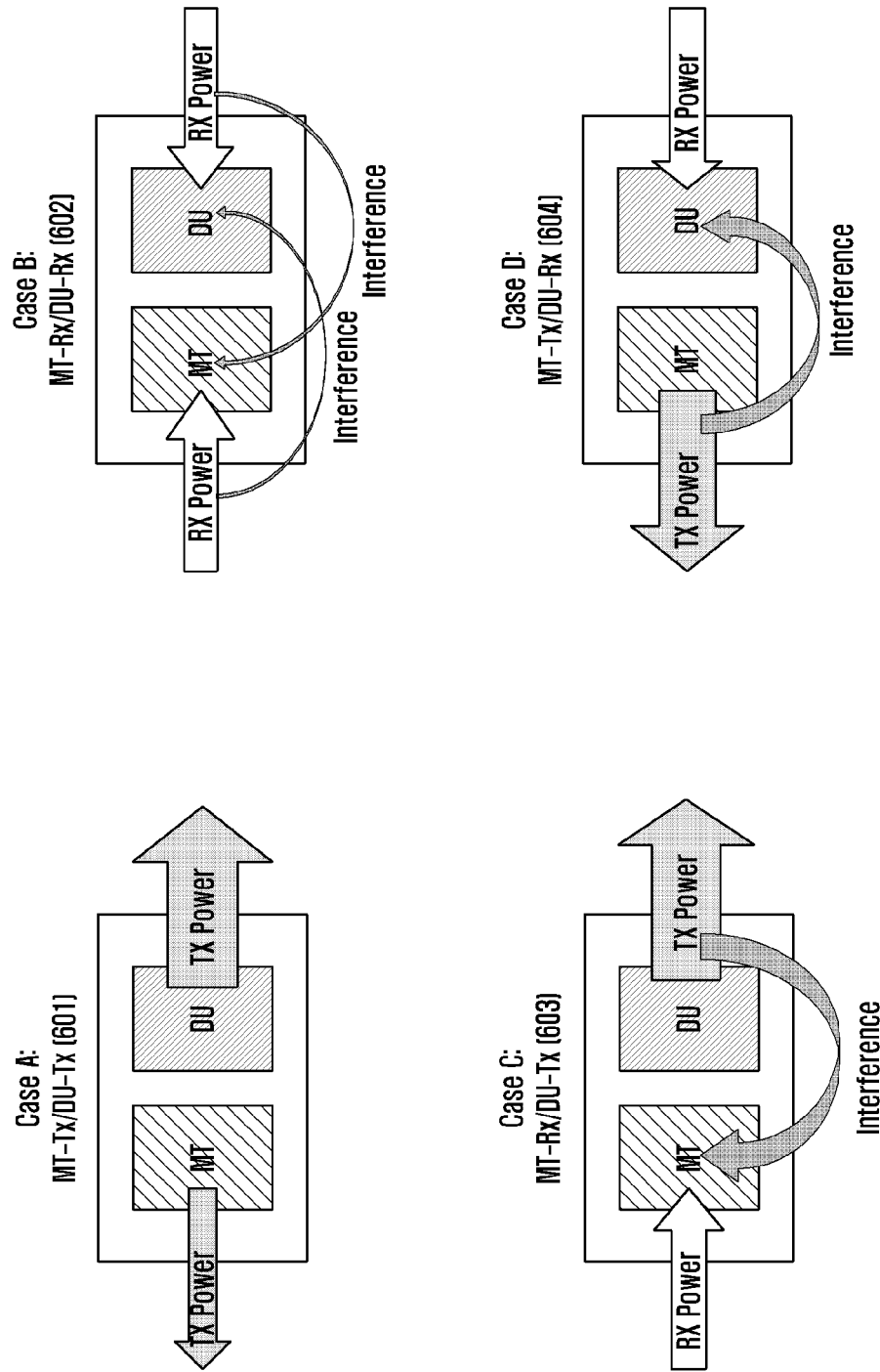
FIG. 6 illustrates multiplexing of a parent link and a child link by using FDM/SDM in IAB an embodiment of the disclosure.

FIG. 6 illustrates multiplexing of a parent link (a backhaul link with a parent IAB node) and a child link (a backhaul link with a child IAB or an access link with a terminal) by using FDM/SDM in an IAB node as shown in FIG. 4 or FIG. 5.

In 601, Case A shows that both an MT and a DU within one IAB node perform a transmission operation by using FDM/SDM.

In 602, Case B shows that both an MT and a DU within one IAB node perform a reception operation by using FDM/SDM.

In 603, Case C illustrates that both an MT and a DU within one IAB node perform reception and transmission operations by using FDM/SDM, wherein the MT performs the reception operation and the DU performs the transmission operation.

In 604, Case D illustrates that both an MT and a DU within one IAB node perform reception and transmission operations by using FDM/SDM, wherein the MT performs the transmission operation and the DU performs the reception operation.

As shown in FIG. 4, FIG. 5, or FIG. 6, the following three problems may occur when simultaneous transmission, simultaneous reception, and simultaneous transmission and reception are performed using FDM/SDM.

As the first problem, a case in which an IAB node (402 of FIG. 4) has only one RF and the IAB node may perform reception in a specific time interval as shown in Case B 602 in FIG. 6 is described. In the above case, the indication indicating whether the IAB node may perform reception or transmission in the specific time interval may be received from a parent IAB node or a donor gNB (401 of FIG. 4) through X2 signaling, an upper-layer signal, or a physical single. As shown in 422 of FIG. 4, when the backhaul downlink (LP,DL) 411, the backhaul uplink (LC,UL) 414, the access uplink (LA,UL) 415, and the like go through FDM/SDM, the IAB node may simultaneously receive signals of the links. In this case, if the IAB node has only one RF and receives the signals of the links, due to a power difference between reception of a backhaul link (e.g., the backhaul downlink 411) and reception of an access link (e.g., the access uplink 415), it is difficult to receive the access link when the IAB node operates an adaptive gain control (AGC) or an analog-to-digital converter (ADC). That is, when the AGC controls a gain and the ADC converts an analog signal to a digital signal, the granularity for the intensity of an input signal is configured to convert the input signal having a specific intensity into an output which can be processed in hardware. In this case, when the granularity of the input signal is configured with a signal intensity of a backhaul link, there may be a problem that the granularity cannot distinguish a signal intensity of an access link since the signal intensity of the access link is much less. Accordingly, data reception performance and reception throughput of the access link may deteriorate.

Therefore, in the disclosure, the following embodiments are provided as a scheme of preventing deterioration of data reception performance and reception throughput of the access link.

In Embodiment 1, in order to ensure data reception performance of an access uplink (415 of FIG. 4) in an IAB node (402 of FIG. 4), reception power of a backhaul downlink (411 of FIG. 4) or a backhaul uplink (414 of FIG. 4) can be adjusted according to reception power of an access uplink (415 of FIG. 4).

Figure 7:
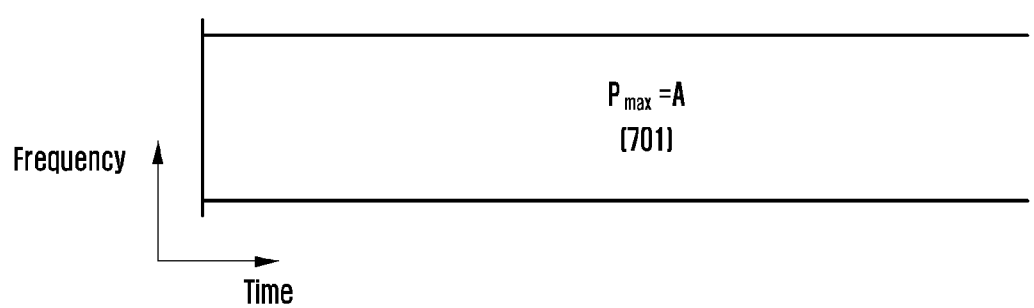
FIG. 7 illustrates Embodiment 1 provided in the disclosure for protection of an access uplink from a terminal in IAB according to an embodiment of the disclosure.

FIG. 7 illustrates Embodiment 1 provided in the disclosure for protection of an access uplink from a terminal in IAB according to an embodiment of the disclosure.

In FIG. 7, in order to adjust the reception power of the backhaul downlink (411 of FIG. 4) according to the reception power of the access uplink (415 of FIG. 4), the maximum value (Pmax) of transmission power of the backhaul downlink (411 of FIG. 4) from the parent IAB node may be reduced to a specific range (e.g., 23 dBm≤A≤24 dBm) or a specific value (e.g., A=24 dBm) (701). Alternatively, the maximum value may be adjusted to the level of the above-described "A" through an offset value corresponding to a targeted reduction level compared to originally transmittable maximum transmission power. The specific range and the specific value or the offset value may be coordinated between a parent node (401 of FIG. 4) and an IAB node (402 of FIG. 4), and the coordination may be performed when the parent node (401 of FIG. 4) and the IAB node (402 of FIG. 4) transmit or receive the information through X2 signaling or a higher-layer signal.

In addition, in order to adjust the reception power of the backhaul uplink (414 of FIG. 4) according to the reception power of the access uplink (415 of FIG. 4), the same type of power control as that of the access uplink may be performed for the backhaul uplink (414 of FIG. 4). That is, the maximum value (Pmax or PCMAX,f,c(i)) of transmission power of the backhaul uplink (414 of FIG. 4) may be reduced to a specific range (e.g., 23 dBm≤A≤24 dBm) or a specific value (e.g., A=24 dBm). Alternatively, the maximum value may be adjusted to the level of the above-described "A" through an offset value corresponding to a targeted reduction level compared to originally transmittable maximum transmission power. In the above-described PCMAX,f,c(i) indicating the maximum value, f indicates a carrier index, c indicates a cell index, and i indicates a transmission occasion (or a transmission moment or a transmission slot). The specific range and the specific value or the offset value may be coordinated between a parent node (401 of FIG. 4) and an IAB node (402 of FIG. 4), and the coordination may be performed when the parent node (401 of FIG. 4) and the IAB node (402 of FIG. 4) transmit or receive the information through X2 signaling or a higher-layer signal.

In addition, the maximum value (PCMAX,f,c(i)) of the transmission power, the specific range and the specific value, or the offset value may be transmitted from the IAB node (402 of FIG. 4) to a child node (403 of FIG. 4) through X2 signaling or a higher-layer signal. The child node (403 of FIG. 4) may determine transmission power of the backhaul uplink (414 of FIG. 4) according to the maximum value (PCMAX,f,c(i)) of the transmission power, the specific range and the specific value, or the offset value, and transmit a signal of the backhaul uplink (414 of FIG. 4) by applying the determined transmission power.

Embodiment 1 is advantageous in that reception of an access link is ensured in all time intervals in which a backhaul link and an access link go through FDM/SDM. However, Embodiment 1 is disadvantageous in that power of the backhaul link may be always reduced and thus the performance of the backhaul link may deteriorate. Accordingly, Embodiment 2 for ensuring the performance of the backhaul link for a predetermined time will be provided according to the second embodiment.

Embodiment 2 provides a method for adjusting reception power of a backhaul downlink (411 of FIG. 4) or a backhaul uplink (414 of FIG. 4) according to reception power of an access uplink (415 of FIG. 4) during a specific configured time interval, and increasing reception power of the backhaul downlink (411 of FIG. 4) or the backhaul uplink (414 of FIG. 4) to the original level during a time interval other than the configured time interval, so as to maintain the performance of a backhaul link for a predetermined time while also ensuring the performance of data reception performance of the access uplink (415 of FIG. 4) in an IAB node (402 of FIG. 4).

Figure 8:
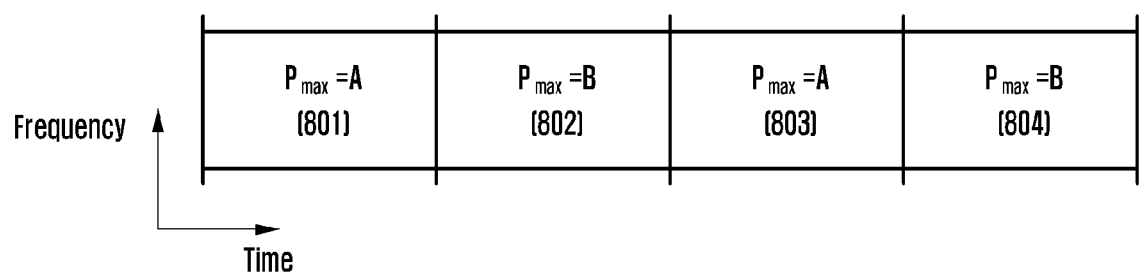
FIG. 8 illustrates Embodiment 2 provided in the disclosure for protection of an access uplink from a terminal in IAB according to an embodiment of the disclosure.

FIG. 8 illustrates Embodiment 2 provided in the disclosure for protection of an access uplink from a terminal in IAB according to an embodiment of the disclosure.

In FIG. 8, a time interval for adjusting the reception power of the backhaul downlink (411 of FIG. 4) according to the reception power of the access uplink (415 of FIG. 4) is configured as shown in 801 and 803. During the configured time intervals 801 and 803, the maximum value of transmission power of the backhaul downlink (411 of FIG. 4) may be reduced to a specific range (e.g., 23 dBm≤A≤24 dBm) or a specific value (e.g., A=24 dBm). Alternatively, the maximum value may be adjusted to the level of the above-described "A" through an offset value corresponding to a targeted reduction level compared to originally transmittable maximum transmission power. During the time intervals 802 and 804 other than the configured time intervals, the maximum value of the transmission power of the backhaul downlink (411 of FIG. 4) may be increased to the original level B. For example, 38 dBm that is greater than 24 dBm may be applied as the transmission power of the backhaul downlink (411 of FIG. 4) by a parent node (401 of FIG. 4), and during this time interval, the performance of the backhaul link can be ensured. During the time interval, an IAB node (402 of FIG. 4) may perform scheduling to restrict transmission of an access uplink (415 of FIG. 4), or may perform scheduling of the transmission of the access uplink by considering that the performance of the access uplink is not ensured during the time interval.

The time interval, the specific range and the specific value, or the offset value may be coordinated between a parent node (401 of FIG. 4) and an IAB node (402 of FIG. 4), and the coordination may be performed when the parent node (401 of FIG. 4) and the IAB node (402 of FIG. 4) transmit or receive the information through X2 signaling or a higher-layer signal.

In addition, in order to adjust the reception power of the backhaul uplink (414 of FIG. 4) according to the reception power of the access uplink (415 of FIG. 4) during the configured time intervals 801 and 803, the same type of power control as that of the access uplink may be performed for the backhaul uplink (414 of FIG. 4). That is, the maximum value ($PCMAX,f,c(i)$) of transmission power of the backhaul uplink (414 of FIG. 4) may be reduced to a specific range (e.g., 23 dBm≤A≤24 dBm) or a specific value (e.g., A=24 dBm). Alternatively, the maximum value may be adjusted to the level of the above-described "A" through an offset value corresponding to a targeted reduction level compared to originally transmittable maximum transmission power.

In the above-described $PCMAX,f,c(i)$ indicating the maximum value, f indicates a carrier index, c indicates a cell index, and i indicates a transmission occasion (or a transmission moment or a transmission slot). The time interval, the specific range and the specific value, or the offset value may be coordinated between a parent node (401 of FIG. 4) and an IAB node (402 of FIG. 4), and the coordination may be performed when the parent node (401 of FIG. 4) and the IAB node (402 of FIG. 4) transmit or receive the information through X2 signaling or a higher-layer signal. In addition, the maximum value ($PCMAX,f,c(i)$) of the transmission power, the time interval, the specific range and the specific value, or the offset value may be transmitted from the IAB node (402 of FIG. 4) to a child node (403 of FIG. 4) through X2 signaling or a higher-layer signal. During the time intervals 802 and 804 other than the configured time intervals, the maximum value of the transmission power of the backhaul uplink (414 of FIG. 4) may be increased to the original level B.

For example, 38 dBm that is greater than 24 dBm may be applied as the transmission power of the backhaul uplink (414 of FIG. 4) by an IAB node (402 of FIG. 4), and during this time interval, the performance of the backhaul link can be ensured. During the time interval, an IAB node (402 of FIG. 4) may perform scheduling to restrict transmission of an access uplink (415 of FIG. 4), or cannot secure the performance of the access uplink even though the transmission of the access uplink is scheduled during the time interval. The child node (403 of FIG. 4) may determine transmission power of the backhaul uplink (414 of FIG. 4) according to the maximum value ($PCMAX,f,c(i)$) of the transmission power, the time interval, the specific range and the specific value, or the offset value, and transmit a signal of the backhaul uplink (414 of FIG. 4) by applying the determined transmission power.

Embodiment 2 is advantageous in that reception of an access link is ensured in a specific time interval in which a backhaul link and an access link go through FDM/SDM, and power of the backhaul link can be recovered to the original level during the other time intervals, whereby the performance of the backhaul link can be maintained. However, Embodiment 2 is disadvantageous in that reception of the access link is ensured only in a specific time division even though FDM/SDM of the backhaul link and the access link is possible, thereby substantially brining the same effect as TDM of the backhaul link and the access link. Accordingly, Embodiment 3 for substantially enabling FDM/SDM of the backhaul link and the access link and ensuring the performance of the access link will be provided according to the third embodiment.

Embodiment 3 describes a case in which FDM/SDM of a backhaul link and an access link is substantially enabled while data reception performance of an access uplink (415 of FIG. 4) in an IAB node (402 of FIG. 4) is also ensured. Embodiment 3 provides a method for controlling transmission power of a backhaul downlink in real time in order to adjust reception power of the backhaul downlink (411 of FIG. 4) according to reception power of the access uplink (415 of FIG. 4).

In Embodiment 3, there may be two options of controlling transmission power of the backhaul downlink (411 of FIG. 4) in real time.

In the first option, transmission power of the backhaul downlink (411 of FIG. 4) may be controlled by a parent node (401 of FIG. 4) and information relating to the controlled transmission power may be indicated to an IAB node (402 of FIG. 4).

In the first option, when the parent node (401 of FIG. 4) transmits a signal in the backhaul downlink (411 of FIG. 4) to the IAB node (402 of FIG. 4), as described in Embodiment 1, coordination between the parent node (401 of FIG. 4) and the IAB node (402 of FIG. 4) may be required to maintain the maximum value (Pmax) of transmission power of the backhaul downlink (411 of FIG. 4) within a specific value by using a specific range (e.g., 23 dBm≤A≤24 dBm), a specific value (e.g., A=24 dBm), or an offset value corresponding to a targeted reduction level compared to originally transmittable maximum transmission power. Accordingly, the specific range, the specific value, or the offset value may be coordinated between the parent node (401 of FIG. 4) and the IAB node (402 of FIG. 4) in advance, and the coordination may be performed when the parent node (401 of FIG. 4) and the IAB node (402 of FIG. 4) transmit or receive the information through X2 signaling or a higher-layer signal.

When transmitting a signal in the backhaul downlink (411 of FIG. 4) to the IAB node (402 of FIG. 4), the parent node (401 of FIG. 4) controls transmission power according to the coordinated value and transmits the signal in the backhaul downlink (411 of FIG. 4). In this case, information on transmission power of signals, which have failed to be transmitted in real time in the backhaul downlink (411 of FIG. 4), for example, a synchronous signal, a reference signal for channel estimation, a physical control channel, and the like may be transmitted from the parent node (401 of FIG. 4) to the IAB node (402 of FIG. 4) through a higher-layer signal in advance, and information on transmission power of a signal such as a physical data channel which can be scheduled in real time in the backhaul downlink (411 of FIG. 4) may be transmitted from the parent node (401 of FIG. 4) to the IAB node (402 of FIG. 4) through a bit field of the physical control channel. The IAB node (402 of FIG. 4) can receive a signal in the backhaul downlink (411 of FIG. 4) by using the transmission power information, thereby protecting the access uplink (415 of FIG. 4).

The second option is identical to the first option in that transmission power of backhaul downlink (411 of FIG. 4) is controlled by the parent node (401 of FIG. 4), but differs from the first option in that required transmission power information may be transmitted from the IAB node (402 of FIG. 4) to the parent node (401 of FIG. 4).

In the second option, the IAB node (402 of FIG. 4) transmits information on transmission power of the backhaul downlink (411 of FIG. 4), required to protect the access uplink (415 of FIG. 4), to the parent node (401 of FIG. 4). In this case, the transmission power information may be transmitted to the parent node (401 of FIG. 4) through an uplink control signal. For example, transmission power information such as a specific value (e.g., A=24 dBm) or an offset value corresponding to a targeted reduction level compared to originally transmittable maximum transmission power may be transmitted. An uplink control signal related to the transmission power information may be periodically or aperiodically transmitted. When transmitting a signal of the backhaul downlink (411 of FIG. 4) to the IAB node (402 of FIG. 4), the parent node (401 of FIG. 4) may control transmission power of the backhaul downlink (411 of FIG. 4) according to the transmission power information and transmit the signal.

In Embodiment 3, in order to adjust the reception power of the backhaul uplink (414 of FIG. 4) according to the reception power of the access uplink (415 of FIG. 4), the same type of power control as that of the access uplink may be performed for the backhaul uplink (414 of FIG. 4). That is, the maximum value (PCMAX,f,c(i)) of transmission power of the backhaul uplink (414 of FIG. 4) may be reduced to a specific range (e.g., 23 dBm≤A≤24 dBm) or a specific value (e.g., A=24 dBm). Alternatively, the maximum value may be adjusted to the level of the above-described "A" through an offset value corresponding to a targeted reduction level compared to originally transmittable maximum transmission power.

In the above-described PCMAX,f,c(i) indicating the maximum value, f indicates a carrier index, c indicates a cell index, and i indicates a transmission occasion (or a transmission moment or a transmission slot). The specific range and the specific value or the offset value may be coordinated between the parent node (401 of FIG. 4) and the IAB node (402 of FIG. 4), and the coordination may be performed when the parent node (401 of FIG. 4) and the IAB node (402 of FIG. 4) transmit or receive the information through X2 signaling or a higher-layer signal. In addition, the maximum value PCMAX,f,c(i) of the transmission power may be transmitted from the IAB node (402 of FIG. 4) to the child node (403 of FIG. 4) through X2 signaling or a higher-layer signal.

In addition, transmission power control information may be transmitted through a bit field of a physical control channel of the backhaul downlink (413 of FIG. 4) transmitted from the IAB node (402 of FIG. 4) to the child node (403 of FIG. 4). The child node (403 of FIG. 4) may determine transmission power of the backhaul uplink (414 of FIG. 4) according to the maximum value (PCMAX,f,c(i)) of the transmission power and the transmission power control information, and transmit a signal of the backhaul uplink (414 of FIG. 4) by applying the determined transmission power.

In Embodiment 3, when the parent node (401 of FIG. 4) transmits a signal of the backhaul downlink (411 of FIG. 4) by controlling transmission power in real time, the transmission power control may affect transmission power of an access downlink of the parent node (401 of FIG. 4), transmitted in another frequency area. Accordingly, reception of system information or a synchronous signal of a terminal connected to the parent node (401 of FIG. 4) may be affected. Therefore, when the first option or the second option of Embodiment 3 is applicable during a specific time interval only. The time interval may be configured as a time interval in which no system information or synchronous signal of the terminal is transmitted. The parent node (401 of FIG. 4) may transmit a signal of the backhaul downlink (411 of FIG. 4) by applying the first option or the second option of Embodiment 3 in the time interval only, and transmit a signal of the backhaul downlink (411 of FIG. 4) without applying Embodiment 3 in a time interval other than the time interval. The time interval may be coordinated between the parent node (401 of FIG. 0.4) and the IAB node (402 of FIG. 4), and the coordination may be performed when the parent node (401 of FIG. 4) and the IAB node (402 of FIG. 4) transmit or receive the information through X2 signaling or a higher-layer signal.

Next, the second problem to be solved in a case where FDM/SDM is performed is described.

The second problem is described with reference to Case A (601) in FIG. 6 in which an IAB node (402 of FIG. 4) includes only one RF, and the IAB node may perform transmission in a specific time interval. In the case above, indication relating to whether the IAB node may perform reception or transmission in the specific time interval may be received from a parent IAB node or a donor gNB (401 of FIG. 4) through X2 signaling or a higher-layer or physical signal. As shown in 421 of FIG. 4, when FDM/SDM is performed for the backhaul uplink (LP,UL) 412, the backhaul downlink (LC,DL) 413, the access downlink (LA,DL) 416, and the like, the IAB node can simultaneously transmit signals of the links. In this case, when the IAB node includes only one RF and transmits the signals of the links, power of the IAB node may be restricted. For example, when the IAB node 402 is indicated by the parent node 401 so as to use the maximum transmission power for transmission of the backhaul uplink (LP,UL) 412, a transmission power value which can be used by the IAB node is limited, and thus transmission power which can used for transmission of the backhaul downlink (LC,DL) 413, the access downlink (LA,DL) 416, and the like may be restricted. Alternatively, an example of the opposite case may occur. Accordingly, an embodiment of the disclosure provides a specific embodiment for an operation of an IAB during the transmission power restriction above.

Embodiment 4 provides a method for determining a link which is to be prioritized to be transmitted, according to a priority rule. That is, as shown in 421 of FIG. 4, when FDM/SDM is performed for the backhaul uplink (LP,UL) 412, the backhaul downlink (LC,DL) 413, the access downlink (LA,DL) 416, or the like, and two or more links may be simultaneously transmitted, transmission or transmission power of a link, which is to be prioritized, is determined according to transmission information or a transmission channel of the link. For example, the priority rule of the transmission channel or the transmission information may be determined as follows, but is a mere example, and the disclosure is not limited thereto:

First priority: Synchronous signal, TRS for channel phase estimation, or synchronous signal or CSI-RS transmitted for discovery of IAB nodes;

Second priority: Uplink control information including HARQ-ACK;

Third priority: Uplink data channel including HARQ-ACK; and

Fourth priority: Downlink control information, downlink data information, and CSI-RS.

The first priority corresponds to a channel or information which may be prioritized, and the importance of a lower priority decreases compared to a higher priority. The above priority rule is an example, information or a channel to be prioritized may be determined differently, and the transmission priority as described above may be determined according to a standard. In the description above, being prioritized means that when the transmission power is limited, the transmission power transmission power is given first, or transmission is always performed. Conversely, not being prioritized means that when the transmission power is limited, transmission power is reduced compared to that of a higher priority, or transmission is dropped.

The transmission channel or transmission information includes a channel or information which can be transmitted in the backhaul uplink (LP,UL) 412, the backhaul downlink (LC,DL) 413, and the access downlink (LA,DL) 416, and when the same channel or information is transmitted through two different links, a backhaul link may be prioritized, or an access link may be prioritized. In addition, the transmission waveform of the links may be configured as CP-OFDM or DFT-S-OFDM through a higher-layer signal or X2 signaling. In the case above, when two different links are transmitted with different waveforms, DFT-S-OFDM may be prioritized over CP-OFDM.

According to the rule above, transmitting, to the IAB node 402, a link including a channel or information having a higher priority, is prioritized to be transmitted in terms of transmission power or transmission, and when transmission power of the IAB node 402 is insufficient, transmission power for a link including a channel or information having a lower priority may be reduced, or transmission may be dropped.

The third problem to be solved in a case where FDM/SDM is performed is described.

The third problem is described with reference to Cases C and D (603 and 604) in FIG. 6 in which an IAB node (502 of FIG. 5) simultaneously perform reception and transmission. In the cases above, indication relating to whether an MT in the IAB node may perform reception or transmission in a specific time interval may be received from a parent IAB node or a donor gNB (501 of FIG. 5) through X2 signaling or a higher-layer or physical signal. In addition, whether a DU in the IAB node may perform transmission or reception may be determined by the DU itself through X2 signaling or a higher-layer or physical signal from an IAB node or a donor gNB (501 of FIG. 5) according to an uplink, a downlink, or a flexible slot and hard/soft/unavailable types of each slot. In this case, when the MT performs reception and the DU performs transmission, or when the MT performs transmission and the DU performs transmission, the interference due to the transmission of the IAB affects the reception of the IAB, and thus the access or backhaul data reception performance or reception throughput may deteriorate.

Accordingly, the disclosure provides a scheme of solving the problem in a case where the transmission of the IAB MT causes interference in the reception of the IAB, specifically, the reception of the IAB DU, through embodiments below.

Embodiment 5 provides a scheme of reducing transmission power of a backhaul uplink (512 of FIG. 5) of an IAB MT to ensure reception performance of an IAB DU in the IAB node (502 of FIG. 5). That is, in order to reduce the maximum value (Pmax or PCMAX,f,c(i))) of transmission power of the backhaul uplink (512 of FIG. 5), new maximum power reduction (MRP) which is applicable at the time of transmission of the IAB MT can be applied. The MPR is applicable when transmission and reception are simultaneously performed in one IAB node, such as a case where the IAB DU performs reception and the IAB MT performs transmission. Alternatively, the MPR is applicable to a case where self-interference (SI) removal is applied in a DU receiver of the IAB node when transmission and reception are simultaneously performed. Alternatively, different MPR values are applicable according to the size of the SI. Alternatively, different MPR values are applicable according to the distance between antenna panels included in the DU and the MT of the IAB node. Alternatively, different MPR values are applicable according to whether timings of the MT transmission and the DU reception of the IAB node coincide in a CP interval.

The MPR values may be coordinated between the parent IAB node or the gNB (501 of FIG. 5) and the IAB node (502 of FIG. 5), and the coordination may be performed when the parent node or the gNB (501 of FIG. 5) and the IAB node (502 of FIG. 5) transmit or receive the information through X2 signaling or a higher-layer signal. Alternatively, the IAB node may apply the MPR value according to the defined standard.

For example, a maximum value of transmission power, which is obtained after applying the MPR to the maximum value (Pmax or PCMAX,f,c(i))) of the transmission power by the IAB node, is as follows:

PCMAX,f,c(i))maximum value after applying MPR=PCMAX,f,c(i))maximum value before applying MPR−MPR.

If the IAB node has failed to receive, in real time, scheduling of simultaneously performing transmission and reception, or when it is determined that transmission and the reception are not simultaneously performed, MPR=0 may be applicable to the corresponding slot or the corresponding transmission occasion. Information on an interval in which transmission and reception are simultaneously performed or an interval in which transmission and reception are not simultaneously performed may be coordinated between the parent node or the gNB (501 of FIG. 5) and the IAB node (502 of FIG. 5), and the coordination may be performed when the parent node or the gNB (501 of FIG. 5) and the IAB node (502 of FIG. 5) transmit or receive the interval information through X2 signaling or a higher-layer signal.

Embodiment 6 provides, as a scheme of reducing transmission power of a backhaul uplink (512 of FIG. 5) of an IAB MT to ensure reception performance of an IAB DU in the IAB node (502 of FIG. 5), a method for applying a new maximum value PCMAX,SI for transmission of the IAB MT instead of a maximum value (Pmax or PCMAX,f,c(i)) of the transmission of the backhaul uplink (512 of FIG. 5).

The PCMAX,SI is applicable when transmission and reception are simultaneously performed in one IAB node, such as a case where the IAB DU performs reception and the IAB MT performs transmission. Alternatively, the PCMAX,SI is applicable to a case where self-interference (SI) removal is applied in a DU receiver of the IAB node when transmission and reception are simultaneously performed. Alternatively, different PCMAX,SI values are applicable according to the size of the SI. Alternatively, different PCMAX,SI values are applicable according to the distance between antenna panels included in the DU and the MT of the IAB node. Alternatively, different PCMAX,SI values are applicable according to whether timings of the MT transmission and the DU reception of the IAB node coincide in a CP interval.

The PCMAX,SI values may be coordinated between the parent IAB node or the gNB (501 of FIG. 5) and the IAB node (502 of FIG. 5), and the coordination may be performed when the parent node or the gNB (501 of FIG. 5) and the IAB node (502 of FIG. 5) transmit or receive the information through X2 signaling or a higher-layer signal. Alternatively, the IAB node may apply the PCMAX,SI value according to the defined standard.

For example, a power value obtained by applying the PCMAX,SI to the maximum value (Pmax or PCMAX,f,c(i))) of the transmission power by the IAB MT, is as follows:

PMT(i)=min{PCMAX,f,c(i)),PCMAX,SI,P0+α·PL+f(i,1)+Δ(i)}.

If the PCMAX,SI is not configured for the IAB node, the IAB node may apply PCMAX,SI according to PCMAX,SI=PCMAX,f,c(i)).

Figure 9:
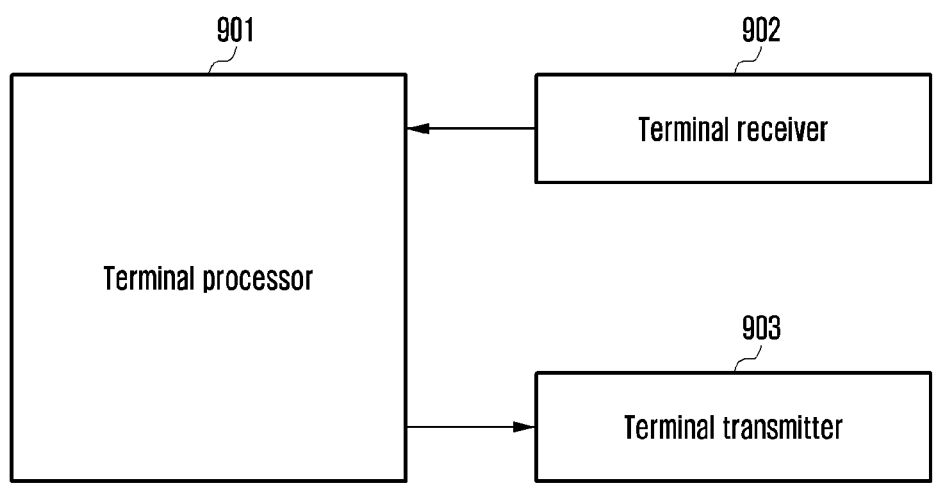
FIG. 9 illustrates a structure of a terminal according to an embodiment of the disclosure.
Figure 10:
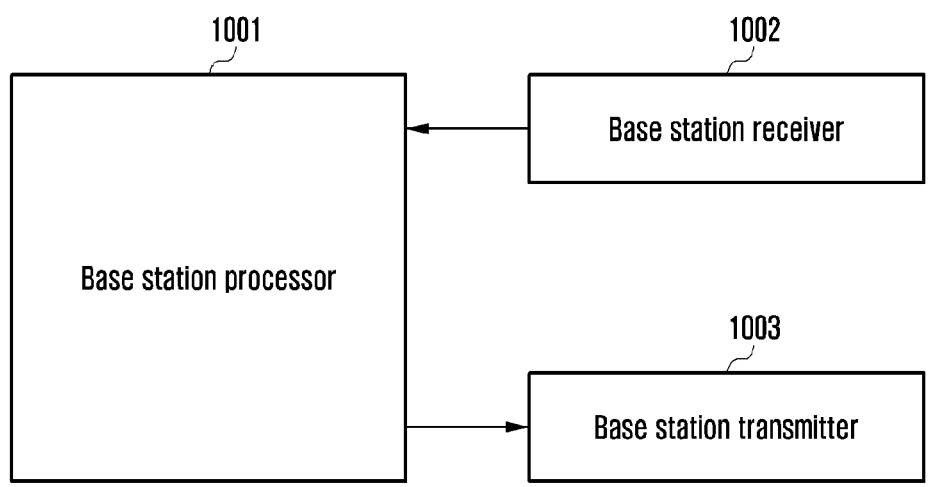
FIG. 10 illustrates a structure of a base station according to an embodiment of the disclosure.
Figure 11:
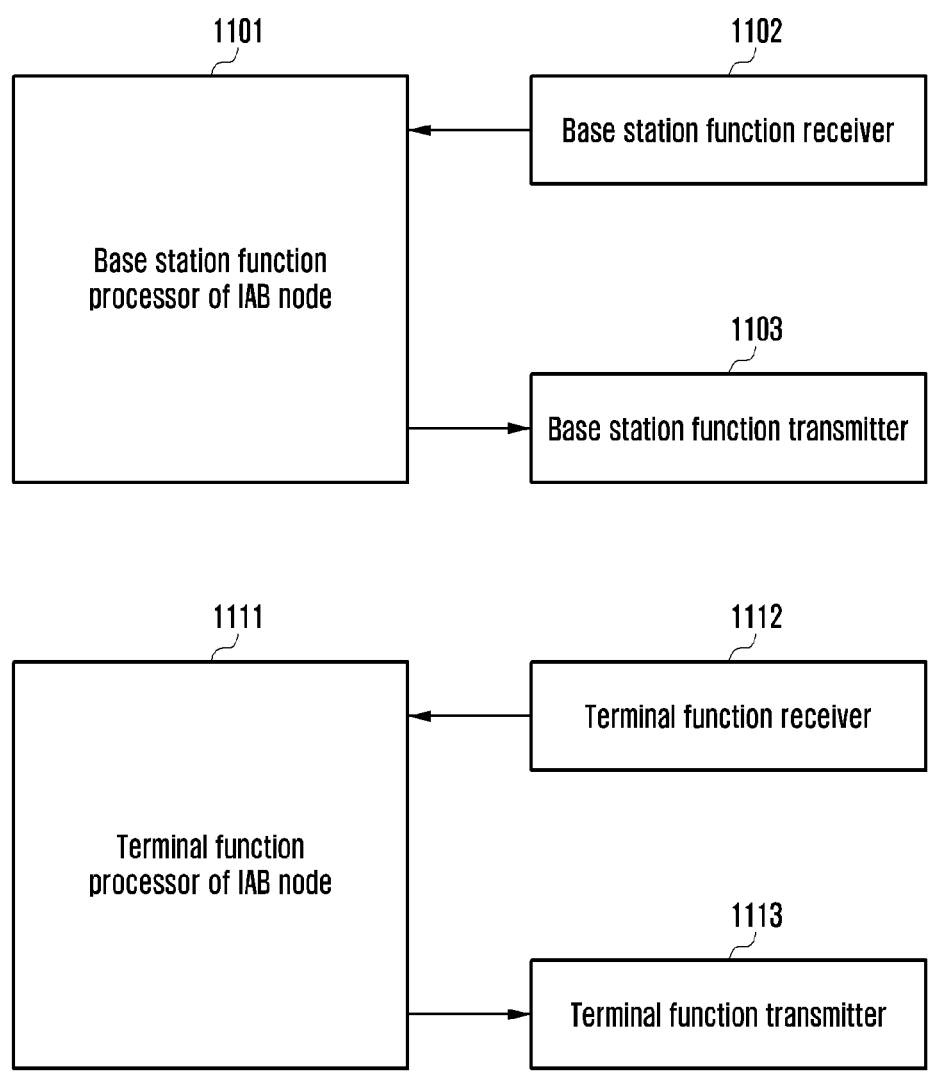
FIG. 11 illustrates a structure of an IAB node according to an embodiment of the disclosure.

The structures of a terminal and a base station including a transmitter, a receiver, and a controller for performing the embodiments of the disclosure are illustrated in FIGS. 9 and 10. In addition, a device of an IAB node is illustrated in FIG. 11. Detailed embodiments describe a transmission or reception method of a base station (a donor base station) which performs transmission or reception of a backhaul link with an IAB node through an mmWave and a terminal which performs transmission or reception of an access link with the IAB node, when the backhaul link and the access link perform transmission or reception through the IAB node in a 5G communication system, and a transmitter, a receiver, and a processor of an IAB node of each of a terminal and a base station may operate to perform the detailed embodiments.

Specifically, FIG. 9 illustrates a structure of a terminal according to an embodiment of the disclosure.

As shown in FIG. 9, the terminal of the disclosure may include a terminal processor 901, a terminal receiver 902, and a terminal transmitter 903.

The terminal processor 901 may control a series of processes that the terminal can operate according to the above-described embodiment of the disclosure. For example, the terminal processor 901 may differently control backhaul link transmission or reception and access link transmission or reception with an IAB node, etc., according to an embodiment of the disclosure. The terminal receiver 902 and the terminal transmitter 903 may be commonly called a transceiver in an embodiment of the disclosure. The transceiver may transmit and receive a signal to and from a base station or an IAB node. The signal may include control information and data. To this end, the transceiver may include an RF transmitter configured to up-convert and amplify the frequency of a transmitted signal and an RF receiver configured to low-noise amplify a received signal and to down-convert a frequency, etc. In addition, the transceiver may receive a signal through a radio channel, transmit the signal to the terminal processor 901, and transmit a signal output from the terminal processor 901, through a radio channel.

FIG. 10 illustrates a structure of a base station (for example, a donor base station) according to an embodiment of the disclosure.

As shown in FIG. 10, the base station of the disclosure may include a base station processor 1001, a base station receiver 1002, and a base station transmitter 1003.

The base station processor 1001 may control a series of processes that the base station can operate according to the above-described embodiment of the disclosure. For example, the base station processor 1001 may differently control access link transmission or reception with an IAB node, etc., according to an embodiment of the disclosure. The base station receiver 1002 and the base station transmitter 1003 may be commonly called a transceiver in an embodiment of the disclosure. The transceiver may transmit and receive a signal to and from a terminal or an IAB node. The signal may include control information and data. To this end, the transceiver may include an RF transmitter configured to up-convert and amplify the frequency of a transmitted signal and an RF receiver configured to low-noise amplify a received signal and to down-convert a frequency, etc. In addition, the transceiver may receive a signal through a radio channel, transmit the signal to the base station processor 1001, and transmit a signal output from the base station processor 1001, through a radio channel.

FIG. 11 illustrates a structure of an IAB node according to an embodiment of the disclosure.

As shown in FIG. 11, the IAB node of the disclosure may include a base station function processor 1101, a base station function receiver 1102, and a base station function transmitter 1103 of an IAB node for transmitting or receiving to or from a lower IAB node through a backhaul link. In addition, the IAB node may include a terminal function processor 1111, a terminal function receiver 1112, and a terminal function transmitter 1113 of an IAB node for performing initial access to an upper IAB node and a donor base station, performing upper signal transmission or reception before transmission or reception through a backhaul link, and performing backhaul transmission or reception with an upper IAB node and a donor base station.

The base station function processor 1101 of the IAB node may control a series of processes that the IAB node can operate like a base station according to the above-described embodiment of the disclosure. For example, the base station function processor 1101 may differently control backhaul link transmission or reception with a lower IAB node, access link transmission or reception with a terminal, etc., according to an embodiment of the disclosure. The base station function receiver 1102 and the base station function transmitter 1103 may be commonly called a transceiver in an embodiment of the disclosure. The transceiver may transmit and receive a signal to and from a lower IAB node and a terminal. The signal may include control information and data. To this end, the transceiver may include an RF transmitter configured to up-convert and amplify the frequency of a transmitted signal and an RF receiver configured to low-noise amplify a received signal and to down-convert a frequency, etc.

In addition, the transceiver may receive a signal through a radio channel, transmit the signal to the base station function processor 1101, and transmit a signal output from the base station function processor 1101, through a radio channel. The terminal function processor 1111 of the IAB node may control a series of processes that a lower IAB node can operate like a terminal in order for the lower IAB node to perform data transmission or reception with the donor base station or the upper IAB node according to the above-described embodiment of the disclosure.

For example, the terminal function processor 1111 may differently control backhaul link transmission or reception, etc., with a donor base station and an upper IAB node according to an embodiment of the disclosure. The terminal function receiver 1112, the IAB node, and the terminal function transmitter 1113 may be commonly called a transceiver in an embodiment of the disclosure. The transceiver may transmit and receive a signal to and a donor base station and an upper IAB node. The signal may include control information and data. To this end, the transceiver may include an RF transmitter configured to up-convert and amplify the frequency of a transmitted signal and an RF receiver configured to low-noise amplify a received signal and to down-convert a frequency, etc. In addition, the transceiver may receive a signal through a radio channel, transmit the signal to the terminal function processor 1111, and transmit a signal output from the terminal function processor 1111, through a radio channel.

The embodiments of the disclosure described and shown in the specification and the drawings are merely specific example that have been presented to easily explain the technical contents of the disclosure and help understanding of the disclosure, and are not intended to limit the scope of the disclosure. That is, it will be apparent to those skilled in the art that other variants may be implemented based on the technical idea of the disclosure. Further, the above respective embodiments may be employed in combination, as necessary.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of an integrated access and backhaul (IAB) node in a communication system, the method comprising:
    identifying that a transmission of a mobile termination (MT) and a reception of a distributed unit (DU) are performed simultaneously;
    identifying a maximum power reduction (MPR) value defined for a case in which the transmission of the MT and the reception of the DU are performed simultaneously, wherein the MPR value is defined so that a maximum power for the transmission of the MT is smaller than a predetermined maximum power for a backhaul uplink;
    calculating the maximum power for the transmission of the MT as a function of the MPR value;
    determining a power for the transmission of the MT based on the maximum power; and
    transmitting a signal based on the determined power.

2. The method of claim 1, wherein the maximum power is identified based on a predetermined maximum power and the MPR value defined for the case of the transmission of the MT and the reception of the DU are performed simultaneously.

3. The method of claim 2, wherein the MPR value is identified based on a coordination with a parent node of the IAB node or predefined.

4. The method of claim 1, wherein the maximum power is identified based on a maximum power value defined for a case of the transmission of the MT and the reception of the DU are performed simultaneously, wherein the maximum power value is defined so that the maximum power for the transmission of the MT is smaller than the predetermined maximum power for the backhaul uplink.

5. The method of claim 4, wherein the maximum power value is identified based on a coordination with a parent node of the IAB node or predefined.

6. An integrated access and backhaul (IAB) node in a communication system, the IAB node comprising:
    a transceiver; and
    a controller operably connected to the transceiver, the controller configured to:
        identify that a transmission of a mobile termination (MT) and a reception of a distributed unit (DU) are performed simultaneously;
        identify a maximum power reduction (MPR) value defined for a case in which the transmission of the MT and the reception of the DU are performed simultaneously, wherein the MPR value is defined so that a maximum power for the transmission of the MT is smaller than a predetermined maximum power for a backhaul uplink;
        calculate a maximum power for the transmission of the MT, as a function of the MPR value;
        determine a power for the transmission of the MT based on the maximum power; and
        transmit a signal based on the determined power.

7. The IAB node of claim 6, wherein the maximum power is identified based on a predetermined maximum power and the MPR value defined for the case of the transmission of the MT and the reception of the DU are performed simultaneously.

8. The IAB node of claim 7, wherein the MPR value is identified based on a coordination with a parent node of the IAB node or predefined.

9. The IAB node of claim 6, wherein the maximum power is identified based on a maximum power value defined for a case of the transmission of the MT and the reception of the DU are performed simultaneously, wherein the maximum power value is defined so that the maximum power for the transmission of the MT is smaller than the predetermined maximum power for the backhaul uplink.

10. The IAB node of claim 9, wherein the maximum power value is identified based on a coordination with a parent node of the IAB node or predefined.

11. The method of claim 1, wherein the MPR value is defined depending on a size of a self-interference (SI).

12. The method of claim 1, wherein the MPR value is defined depending on a distance between antenna panels included in the DU and the MT.

13. The method of claim 1, wherein the MPR value is defined depending on whether timings of the transmission of the MT and the reception of the DU coincide in a cyclic prefix (CP) interval.

\* \* \* \* \*